(12) United States Patent
Li et al.

(10) Patent No.: US 11,113,075 B2
(45) Date of Patent: Sep. 7, 2021

(54) LAUNCHING A MIDDLEWARE-BASED APPLICATION

(71) Applicant: International Business Machines Corporation, Armonk, NY (US)

(72) Inventors: Guang Cheng Li, Beijing (CN); Yuan Wang, Beijing (CN); Xiao Xi Liu, Beijing (CN); Jian Ma, Beijing (CN); Jing Min Xu, Beijing (CN); Lin Yang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 81 days.

(21) Appl. No.: 16/190,689

(22) Filed: Nov. 14, 2018

(65) Prior Publication Data

US 2020/0150974 A1     May 14, 2020

(51) Int. Cl.
*G06F 9/445* (2018.01)

(52) U.S. Cl.
CPC .................................. *G06F 9/445* (2013.01)

(58) Field of Classification Search
None
See application file for complete search history.

(56) References Cited

U.S. PATENT DOCUMENTS

| | | | |
|---|---|---|---|
| 9,460,270 B2 * | 10/2016 | Amano | G06F 9/4843 |
| 10,002,247 B2 * | 6/2018 | Suarez | G06F 9/45558 |
| 10,032,032 B2 * | 7/2018 | Suarez | G06F 21/577 |
| 10,261,782 B2 * | 4/2019 | Suarez | G06F 9/45558 |
| 10,901,768 B1 * | 1/2021 | Mandadi | H04L 67/1095 |
| 2009/0055821 A1 | 2/2009 | Grcevski et al. | |
| 2013/0097603 A1 * | 4/2013 | Amano | G06F 21/566 718/1 |
| 2016/0371127 A1 * | 12/2016 | Antony | G06F 9/505 |
| 2017/0255462 A1 * | 9/2017 | Azagury | G06F 8/52 |
| 2017/0371696 A1 * | 12/2017 | Prziborowski | G06F 9/45558 |
| 2018/0113684 A1 | 4/2018 | Dawson et al. | |
| 2019/0289371 A1 * | 9/2019 | Mok | G06F 21/123 |

FOREIGN PATENT DOCUMENTS

CN          107329800 A          11/2017

OTHER PUBLICATIONS

Mell et al., "The NIST Definition of Cloud Computing," National Institute of Standards and Technology, Sep. 2011, Special Publication 800-145, U.S Department of Commerce, 7 pages.

\* cited by examiner

*Primary Examiner* — Umut Onat
(74) *Attorney, Agent, or Firm* — Amin, Turocy & Watson, LLP

(57) ABSTRACT

Embodiments of the present invention relate to a computer-implemented method, system and computer program product facilitating launching a middleware-based application. In some embodiments, a computer-implemented method includes: preparing, by a device operatively coupled to one or more processing units, an execution environment for middleware to be included in a container hosted on a machine; detecting, by the device, a request to schedule an application to be executed in the machine using the middleware; and in response to the request being detected, launching, by the device, the application within the container based on the prepared execution environment.

18 Claims, 6 Drawing Sheets

LAUNCHING A MIDDLEWARE-BASED APPLICATION

BACKGROUND

The present disclosure relates generally to containerized applications, and more specifically, to launching a middleware-based application.

SUMMARY

According to one embodiment of the present invention, there is provided a computer-implemented method. In some embodiments, a computer-implemented method includes: preparing, by a device operatively coupled to one or more processing units, an execution environment for middleware to be included in a container hosted on a machine; detecting, by the device, a request to schedule an application to be executed in the machine using the middleware; and in response to the request being detected, launching, by the device, the application within the container based on the prepared execution environment.

According to another embodiment of the present invention, there is provided a system. The system comprises: a memory that stores computer executable components; and a processor, operably coupled to the memory, and that executes the computer executable components stored in the memory. The computer executable components comprises at least one computer-executable component that: prepares an execution environment for middleware to be included in a container hosted on a machine; detects a request to schedule an application to be executed in the machine using the middleware; and in response to the request being detected, launches the application within the container based on the prepared execution environment.

According to a further embodiment of the present invention, there is provided a computer program product. The computer program product facilitates launching a middleware-based application, the computer program product comprising a computer readable storage medium having program instructions embodied therewith. The program instructions executable by a processor to cause the processor to: prepare, by the processor, an execution environment for middleware to be included in a container hosted on a machine; detect, by the processor, a request to schedule an application to be executed in the machine using the middleware; and in response to the request being detected, launch, by the processor, the application within the container based on the prepared execution environment.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
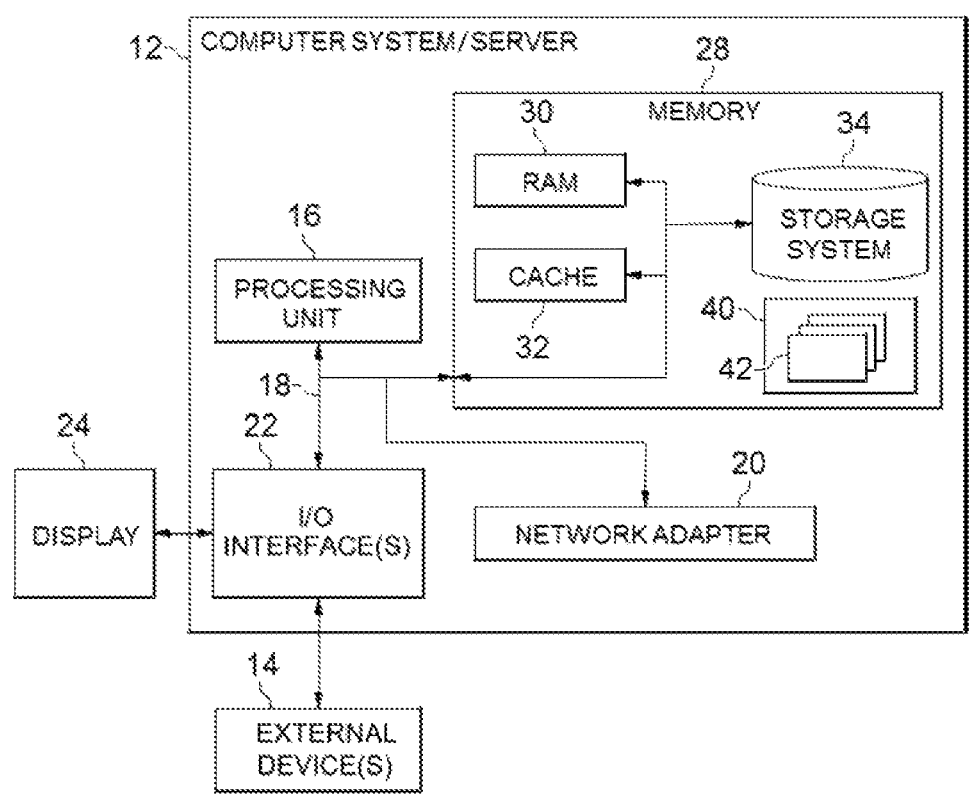
FIG. 1 depicts a cloud computing node in accordance with one or more embodiments disclosed herein.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
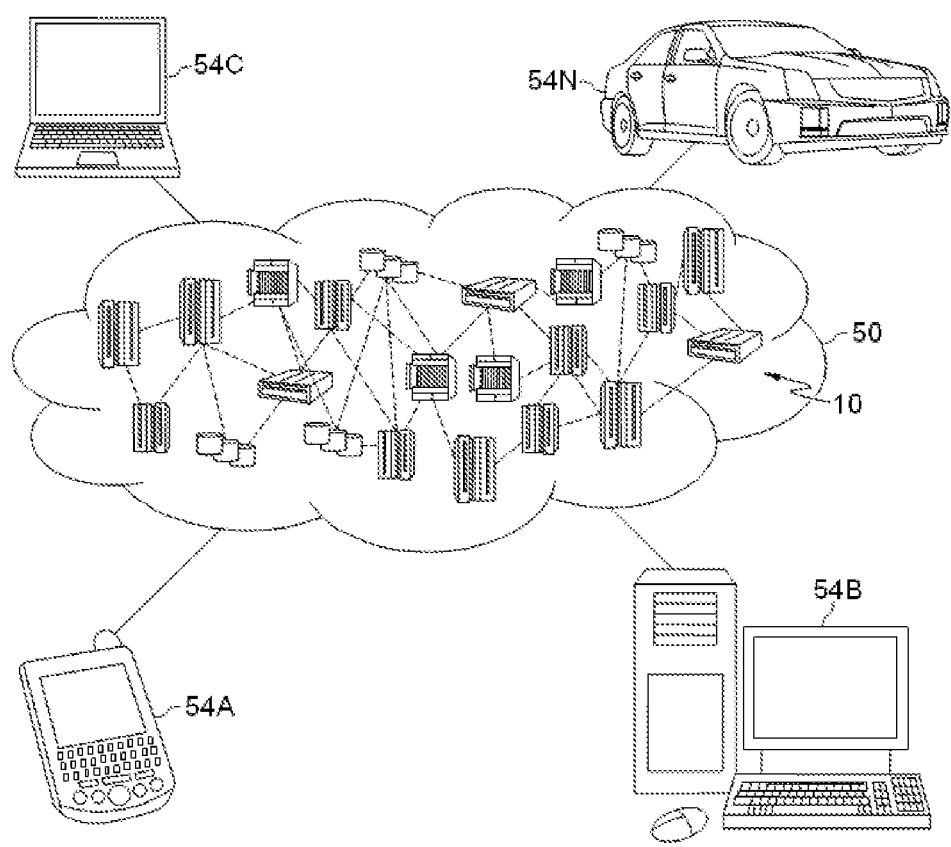
FIG. 2 depicts a cloud computing environment in accordance with one or more embodiments disclosed herein.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
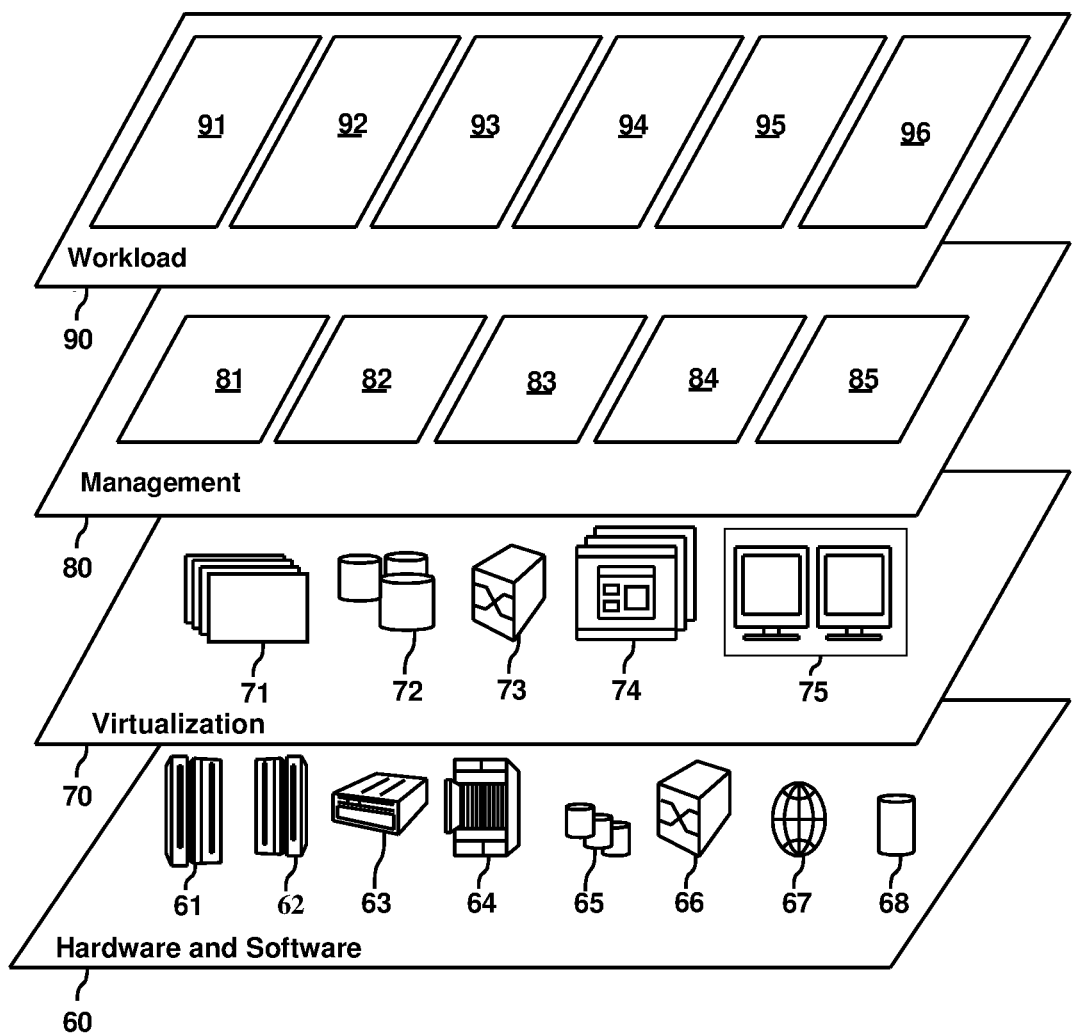
FIG. 3 depicts abstraction model layers in accordance with one or more embodiments disclosed herein.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application launching process 96. The application launching process 96 may implement the solution for process management.

Software containers (also referred to as "containers") have emerged to address the increasing portability needs of software applications. A container bundles an application and all its dependencies and libraries into an isolated, resource controlled and easy-to-deployed block that can run on any operating system in any computing environment. Containers can be deployed on either physical or virtual machines in private, public or hybrid clouds, thereby facilitating workload management of large scale applications. Multiple containers can run on a single machine and share the operating system kernel, while keeping processes and resources such as memory, CPU and disks isolated from each other.

The containers can be horizontally scaled on demand with flexible deployment in the system. In addition, the containers can allow one or more applications to quickly launch and run within the respective user spaces without overhead associated with starting and maintaining separate virtual machines. This makes application launching efficient and fast. With these features, application launching and execution within containers becomes more and more popular in the industry. In some cases, an application can be executed based on middleware, and thus the container may be provided using the middleware. However, the slow startup of middleware decreases the speed of launching the container and thus the application.

To define more clearly the terms used herein, the following exemplified definitions are provided, but the meaning of the terms should be interpreted broadly as known to the technical field to which the embodiments of the present invention relates.

The term "container" or "software container" refers to an executable (e.g., "run-time") entity that can establish a context for running a program or set of programs using, or included as, components of a container image. The container is a form of computer virtualization, which may reference one or more container "images" and isolate execution of one or more programs (and files or file systems) with regard to other programs and resources of a machine/host (such as a computer). A LINUX container is an example of a software container, as are other software container technologies, or containers implemented for operating system types other than LINUX. A software component such as an application can run in a software container on a physical or virtual machine.

The term "container image" or "software container image" refers to a read-only boot image including programs or files required for a container to execute, which can be organized as layers and images, for execution on a computer and utilizing an underlying (or, "host") operating system (OS) or operating system kernel ("kernel"). A container image may be a single image or may aggregate a plurality of images within it. For purposes of illustrating the disclosure, and hereinafter, a "container image" refers to a single container image or an aggregation of images forming a container image. Programs external to a container image (e.g., an operating system) may view or treat a container image as a file. An image file may be in a particular format. For example, an image file can be formatted in the Tape Archive (TAR) format.

Containers can execute within the environment and programming interfaces of an underlying (i.e., not included within the container image), or host, operating system (OS) of a computer. A host OS (e.g., a LINUX operating system or LINUX kernel) can enable, initiate, or control execution of the programs within a container image on a particular computer. The host OS can isolate the operations of programs within the container from other programs executing on the computer, and from resources of the computer not required by the programs within the container. A host OS can run a number of different containers, or a number of instances of the same container, on a single computer.

A container can utilize a complete host OS or can utilize only a host OS kernel (e.g., components of an operating system that manage the hardware, such as CPUs and memory of the computer), and access to the hardware by application programs running "on top of" the operating system). Programs executing within (or, using) a container image can share the host OS with other programs executing on the same computer, including programs executing in other containers. Containers can offer many features of computer virtualization while requiring less memory (by virtue of not requiring a complete instance of an operating system for each instance of a container), and executing with lower system overhead (by virtue of directly utilizing the underlying operating system kernel, versus an operating system in a VM-hosted environment). These advantages of containers have contributed to adoption of containers as a virtualization technology within the computing industry.

The term "middleware" refers to software that generally runs primarily at an intermediate layer in a software or protocol stack. For example, in a container, middleware can run on top of the OS kernel and the hardware layer, and below applications in the application layer. Middleware allows the applications to interact across different hardware and network environments. To support the application execution in containers, the middleware can be included in the container image used to provide the containers.

Figure 4:
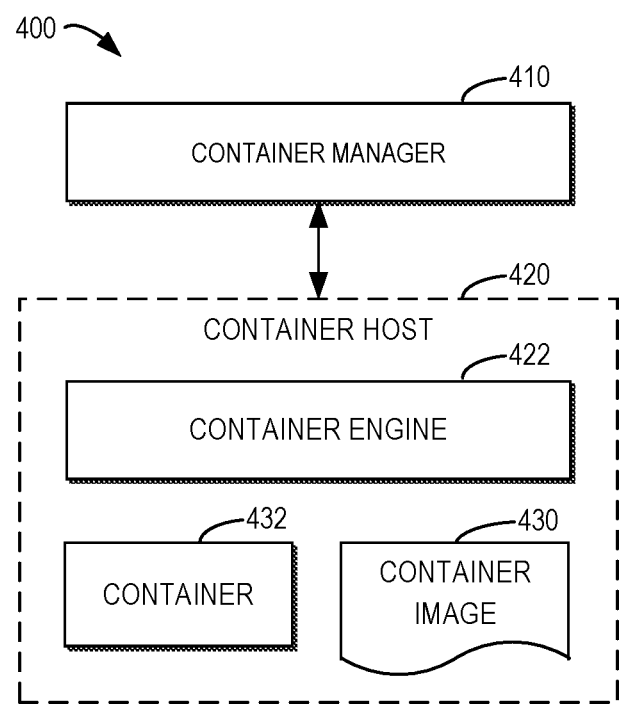
FIG. 4 depicts a block diagram of a conventional containerized system.

FIG. 4 illustrates a conventional containerized system 400. As shown, the system 400 includes a container manager 410 configured to manage and schedule the allocation and deployment of containers to a container host 420 or cluster of container hosts. The container manager 410 can include one or more container orchestration engines (COE), such as Kubernetes and Docker Swarm, which can provide basic scheduling capabilities, focusing mainly on CPU, memory and storage requirements. The container host 420 can include a container engine 422 to deploy and reclaim containers in the container host 420 in response to requests from the container manager 410.

To deploy a container, a container image 430 can be provided on the container host 420 first. The container image 430 can be provided from the container manager 410 or manually by a user of the container host. The container engine 422, upon receiving a request to launch an application from the container manager 410, will create a container 432 using the container image 430 and execute the application within the container 432. In some cases, more than one container 432 can be created depending on the request(s) from the container manager 410. As used herein, an application can be or include a program/process or set of programs/processes to be executed, which may thus be referred to as an application program.

Although one container image is illustrated in the system 400, in some implementations, two or more container images can be populated on the container host 420 and used for provisioning of containers for application execution. In addition, although one container host 420 is illustrated, the container manager 410 can allocate and deploy containers among a cluster of container hosts. Upon completing of the application, the corresponding container 432 can be deleted from or deactivated on the container host 420.

In the containerized system, the containers can be scaled horizontally on a single host and share the operating system kernel of the host. In addition, a container can be built on an overlay filesystem which contains code, runtime, system tools, system libraries, and so on. With these features, a large number of containers can be run on a single host and each can be launched in the container host fast (for example, in seconds).

In container-based systems, a "serverless" scenario is becoming a hot topic. A serverless containerized system does not indicate that no computer servers are used in the system. Rather, the term indicates that a user of the serverless containerized system does not need to provision or manage the physical hosts, virtual machines, containers, and the like, that are used by the system in executing instructions of the user. The serverless containerized system allows containers to be allocated and reclaimed in a fast manner. This is extremely suitable for a service that occurs sparsely or requires a large number of containers in a certain period of time.

One factor that can delay the startup of the containers is the use of middleware. An application can require middleware for execution. To support the application execution, the container image can include the middleware and thus launching of a container can involve launching the middleware. Middleware startup generally takes a relatively long time, thereby slowing down the process of container launching and the process of application launching using the middleware. The slow container and application launching breaks a lot of container usages in containerized systems such as service continuity during application update, quick autoscaling, serverless, container maintenance, and the like.

One possible way to address the above problem is to optimize startup configuration of middleware. However, it has been found that limited improvement can be achieved for the optimization because the speed of middleware startup is restricted by hardware configuration. In addition, different optimization parameters can be required for different hardware and operating system configurations. Thus, the optimization process is required in individual containerized systems, which makes the optimization impossible to be broadly adopted in many systems.

According to embodiments of the present invention, there is proposed a solution to improve launching efficiency of a middleware-based application in a containerized system. According to this solution, an execution environment is prepared for middleware to be included in a container in advance of application launching. If a request is detected to schedule an application to be executed in the machine using the middleware, the application is launched based on the prepared execution environment instead of starting from scratch. In this way, the process of application launching can be accelerated by starting from the execution environment that has been prepared for the middleware.

Figure 5:
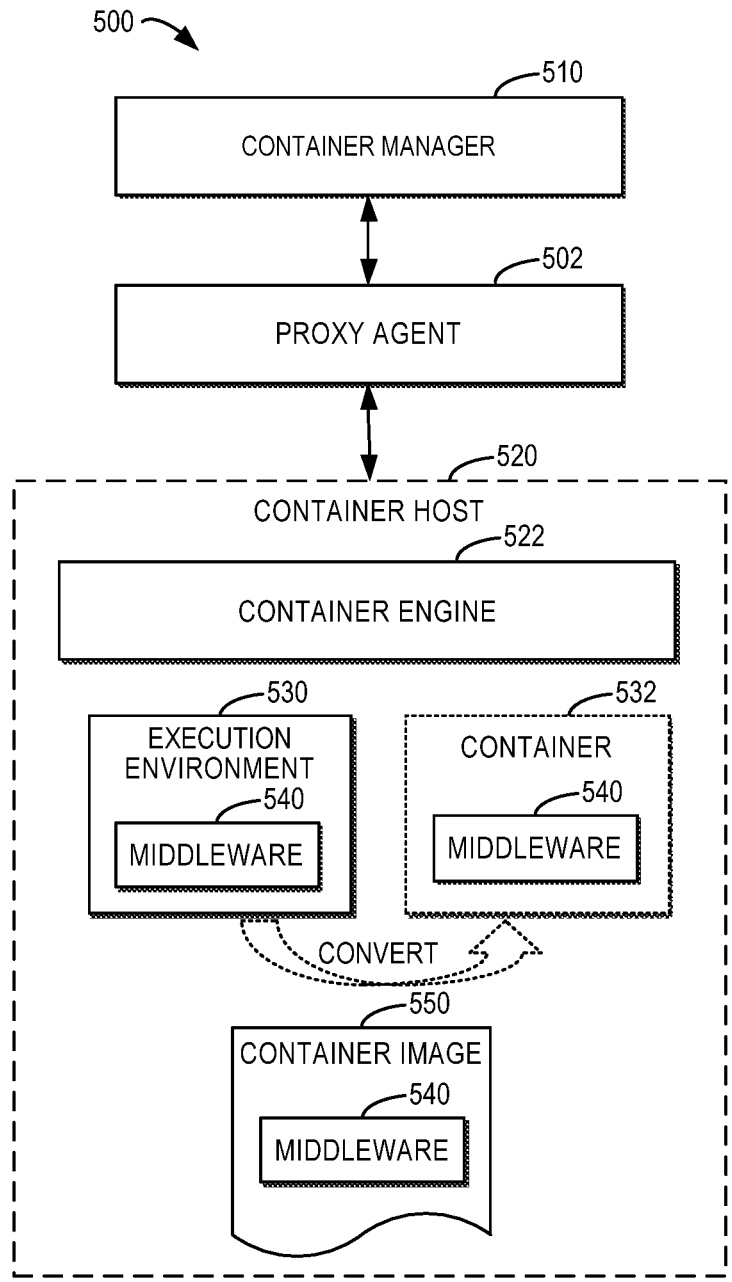
FIG. 5 depicts a block diagram of a containerized system in accordance with one or more embodiments disclosed herein.

Embodiments of the present invention will be described in detail with reference to the figures. Reference is first made to FIG. 5, which illustrates a containerized system 500 in accordance with one or more embodiments disclosed herein. The system 500 includes a container manager 510 configured to manage and schedule allocation and deployment of containers into a container host 520. Although not shown, a cluster of container hosts similar to the container host 520 can be managed by the container manager 510 to provide the capability of container allocation and deployment.

The container manager 510 can include one or more container orchestration engines (COE), such as Kubernetes and Docker Swarm, which can provide basic scheduling capabilities, focusing mainly on CPU, memory and storage requirements. The container host 520 can include a container engine 522 to deploy and reclaim one or more containers in the container host 520 in response to requests from the container manager 510. The container host 520 can be one or more physical or virtual machines that can provide computing and storage resources for the container deployment. As used herein, the term "container host" refers to a stack of host on which the OS, container engine, container image(s), and container(s) reside.

The system 500 further includes a proxy agent 502 provided between the container manager 510 and the container engine 522. The proxy agent 502 is configured to perform the solution proposed in the embodiments of the present invention to improve the launch efficiency of an application. The proxy agent 502 may be implemented in hardware, software, or a combination thereof. Although shown as a separate entity, part or all of the functions of the proxy agent 502 as described herein can be implemented in either the container manager 520 or the container engine 522.

According to embodiments of the present invention, the proxy agent 502 is configured to prepare an execution environment 530 for middleware 540 to be included in a container hosted on the container host 520. The execution environment 530 is created for the middleware only, not for the whole container.

In some embodiments, the preparation of the execution environment 530 for the middleware 540 can be triggered by receiving a container image 550 including the middleware 540 at the container host 520. The container image 550 can be stored, for example, in an image repository, and can be provided from the image repository to the container host 520 in response to a request from the container manager 510 or a user. The population of the container image 550 indicates that one or more applications related to the container image 550 are to be launched on the container host 520.

To determine whether the container image 550 includes the middleware 540, the proxy agent 502 can read and analyze the file(s) included in the container image 550. As an alternative, the proxy agent 502 can instruct the container engine 522 to create an empty container based on the container image 550 and determine from the created container whether middleware is used within the container.

The proxy agent 502 can intercept interactions between the container manager 510 and the container engine 522. If the container manager 510 initiates a request to populate the container image 550 onto the container host 520, the proxy agent 502 can intercept the request and determine that the container image 550 is provided into the container host 520 according to this request. If the provision of the container image 550 is initiated by a user, the proxy agent 502 can receive information about the provision from the container engine 522 of the container host 520 which monitors the container deployment therein.

In some embodiments, the container manager 510 can be configured to consider the proxy agent 502 as a container engine connected to a port of the container manager 510. The messages/requests targeted to the container engine 522 can be passed to the proxy agent 502, for example, through an application program interface (API) between the container manager 510 and the proxy agent 502. In some embodiments, a command line interface (CLI) of the container engine 522 can be configured to consider the proxy agent 502 connected to the container engine 522 as an API port of the container engine 522. Thus, the messages/requests between the container manager 510 and the container engine 522 can be intercepted through CLI.

In addition to a trigger of receiving the container image 550 by the container host, or as an alternative, the preparation of the execution environment 530 for the middleware can also be triggered in other manners, such as by a user indication indicating that middleware is to be used or by a prediction that the middleware will be used.

Preparing the execution environment 530 for the middleware 540 can entail executing or running the middleware 540, for example, running the program or scripts of the middleware. The execution environment 530 is regarded as a warm-up environment for the middleware. In some embodiments, the proxy agent 502 can prepare the execution environment 530 directly as a container with the middleware 540 executed therein. Only the middleware runs in this container and no application executed on top of the middleware. The container can be provisioned based on the container image 550. The proxy agent 502 can instruct the container engine 522 to directly provision the container in the container host 520. As used herein, provisioning a container indicates that the container can be provisioned by either discovering an unused container in the container host 520 or by starting a new container hosted by the container host 520.

In order to provision the container, a customized binary(ies) or script(s) can be added in the container image 550 to execute the middleware 540 only. The customized binary(ies) or script(s) can be specified as a startup command to launch/start the middleware 540. After the startup of the middleware 540, the container (i.e., the execution environment 530) can run according to the middleware 540. For example, depending on the configuration of the middleware 540, the container can listen to some ports of the container engine 522 for messages/requests and can wait for an application to register.

In some other embodiments, the proxy agent 502 can alternatively prepare the execution environment 530 by launching a process for the middleware 540. Generally provisioning and maintaining a container can consume a number of resources of the container host 520. By simply running a process, it is possible to reduce the resource consumption on the container host 520.

The proxy agent 502 maintains the prepared execution environment 530 in the container host 520. The proxy agent 502 can continue detecting whether a request is scheduled to the container host 520 to schedule an application to be executed in the machine using the middleware. The request to schedule the application can be initiated from the container manager 510 to the container engine 520. The proxy agent 502 can detect such request by intercepting interactions between the container manager 510 and the container engine 520.

If the request is detected, the proxy agent 502 decides to launch the application within a container hosted on the container host 520 based on the prepared execution environment 530. In some embodiments, when the request to schedule the application using the middleware 540 is detected from the container manager 510, the proxy agent 502 can determine whether the execution environment 530 for the middleware 540 has been prepared. In response to determining that the execution environment 530 has been ready, the proxy agent 502 can send an instruction to the container engine 522 to launch the application.

In the embodiment where the execution environment 530 is prepared as a container as described above, the application can be directly launched using the container. In the embodiment where the execution environment 530 as described above, the proxy agent 502 can provision a container 532 by incorporating the processor for the middleware 540 into the container. That is, the execution environment 530 can be converted into a container. Since the process have been executed, the direct provisioning of the container 532 will not take a long time as compared to the container provision process started without the startup of the middleware 540.

When the container for the application is provided (such as the execution environment 530 prepared as the container or the converted container 532), the proxy agent 502 can indicate to this container that the application will be started therein. The application can be registered with the container. As such, the container with the middleware executed only may be converted to an application container. To register the application, the container can determine whether an application layer is already in the container. If no application layer is detected, a new application layer for the requesting application can be overlaid or copied into the container, for example, on top of the middleware. If an application layer is detected in the container, the application can be run directly therein.

In some embodiments, if a request to schedule the application using the middleware 540 is received and the proxy agent 502 determines that no execution environment is prepared for the middleware 540, the proxy agent 502 can start to prepare such environment in a way as described above.

If the application has been successfully launched in the container hosted on the container host 520, which means that no prepared execution environment is present for the subsequent applications, the proxy agent 502 can prepare a further execution environment for the middleware 540 in the container host 520. In this way, when the prepared execution environment is consumed, a further and new execution environment can be generated for future use.

In some embodiments, the proxy agent 502 can generate more than one execution environments 530 for the middleware 540 at the beginning. It is advantageous especially for the cases where a large number of requests are initiated to the container host 520 to schedule applications using the middleware 540. The number of the execution environments for a certain middleware can be limited to reduce the resource overhead and meanwhile keep the possibility of missing prepared execution environments for application schedule requests.

In some embodiments, instead of directly launching the application within the prepared execution environment 530, in response to detecting the request to schedule an application to be executed in the machine using the middleware 540, the proxy agent 502 can generate or instruct the container engine 522 to generate a copy of the execution environment 530. For example, a copy of the process for the middleware 540 or a copy of the container with the middleware 540 executed therein can be generated. The application can be launched based on the copy of the execution environment, for example, executed within the container. In this way, there is always a prepared execution environment in the container host 520 to respond to the application schedule requests from the container manager 510. The copying of the prepared execution environment is generally faster than the startup of the middleware 540. Thus, the process of the application launching can still be accelerated in these embodiments.

In the above embodiments, the execution environment(s) for the middleware 540 included in the container image 550 has been described. A container image 550 can include various middleware. In this case, all the middleware can be launched in the execution environment(s) during the preparing stage. In some examples, more than one container image is provided into the container host 520. For any container image that includes middleware, the corresponding execution environment(s) can be prepared according to the embodiments of the present invention.

In some of the above embodiments, as described, the proxy agent 502 can intercept interactions between the container manager 510 and the container engine 522. To ensure the normal interactions between the container manager 510 and the container engine 522, the proxy agent 502 can forward the interactions (requests, instructions, and the like) therebetween. The container manager 510 and the container engine 522 can also directly interact with each other in addition to providing their interactions to the proxy agent 502.

According to the embodiment of the present invention, with the proxy agent 502, the functionality of speeding up the application launching as described herein is transparent to the container manager 520, the container engine 522 and the end users. There is no need to update the container manager 520 and the container engine 522.

In some embodiments, if it is detected that the container image 550 is deleted from the container host 520, one or more execution environment that has been deployed on the container host 520 for the middleware 540 can also be deleted or reclaimed by the container engine 522 from the container host 520.

Figure 6:
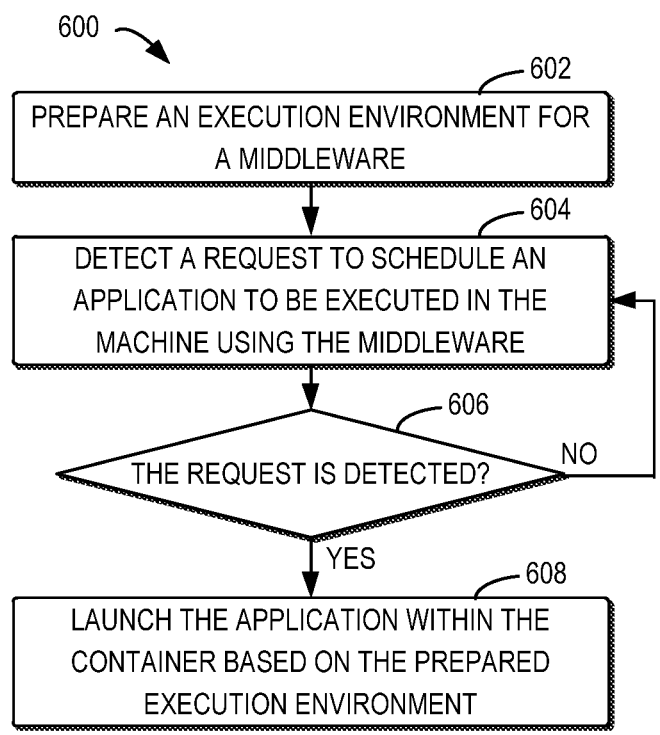
FIG. 6 depicts a flowchart of an example computer-implemented method in accordance with one or more embodiments disclosed herein.

FIG. 6 shows a flowchart of an example method 600 in accordance with some embodiments of the present invention. The method 600 can be implemented at the proxy agent 502 as shown in FIG. 5, which can be embodied as a separate entity or at least partially included in the container manager 510 and/or the container engine 522. For the purpose of discussion, the method 600 will be described from the perspective of the proxy agent 502 with reference to FIG. 5.

At block 602, the proxy agent 502 prepares an execution environment for middleware to be included in a container hosted on a machine. At block 604, the proxy agent 502 detects a request to schedule an application to be executed in the machine using the middleware. At block 606, the proxy agent 502 determines whether the request is detected.

If the request is detected, at block 608, the proxy agent 502 launches the application within the container based on the prepared execution environment. If the request is not detected, the proxy agent 502 continues the detecting of the request at block 604.

In some embodiments, preparing the execution environment can comprise in response to a container image being provided for the machine, determining, by one or more processing units, whether the container image includes the middleware; and in response to determining that the container image includes the middleware, preparing, by one or more processing units, the execution environment based on the container image.

In some embodiments, preparing the execution environment can comprise preparing, by one or more processing units, the execution environment by provisioning the container with the middleware executed therein.

In some embodiments, preparing the execution environment can comprise preparing, by one or more processing units, the execution environment by launching a process for the middleware.

In some embodiments, launching the application can comprise provisioning, by one or more processing units, the container by incorporating the process for the middleware into the container; and launching, by one or more processing units, the application using the provisioned container.

In some embodiments, launching the application can comprise registering, by one or more processing units, the application with the execution environment; and launching, by one or more processing units, the registered application into the execution environment.

In some embodiments, launching the application can comprise generating, by one or more processing units, a copy of the prepared execution environment; and launching, by one or more processing units, the application based on the copy of the prepared execution environment.

In some embodiments, the method 600 can further comprise preparing, by one or more processing units, a further execution environment for the middleware before the launching of the application.

In some embodiments, the method 600 can further comprise preparing, by one or more processing units, a further execution environment for the middleware after the launching of the application.

It should be noted that the processing of launching a middleware-based application according to embodiments of this disclosure could be implemented by computer system/server 12 of FIG. 1.

One or more embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of one or more embodiments of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
preparing, by a device operatively coupled to one or more processing units, a first execution environment for middleware to be included in a container hosted on a machine wherein a proxy agent instructs a container engine to generate a copy of the first execution environment, wherein the middleware is launched based on the copy of the first execution environment;
detecting, by the device, a request to schedule an application to be executed in the machine using the middleware;
in response to the request being detected, launching, by the device, the application within the container based on the first execution environment having been prepared; and
based on the request to schedule the application to be executed in the machine using the middleware, preparing, by the device, a second execution environment for the middleware before the launching of the application.

2. The computer-implemented method of claim 1, wherein preparing the first execution environment comprises:
in response to a container image being provided for the machine, determining, by the device, whether the container image includes the middleware; and
in response to determining that the container image includes the middleware, preparing, by the device, the first execution environment based on the container image.

3. The computer-implemented method of claim 1, wherein preparing the first execution environment comprises:
preparing, by the device, the first execution environment by provisioning the container with the middleware executed therein.

4. The computer-implemented method of claim 1, wherein preparing the first execution environment comprises:
preparing, by the device, the first execution environment by launching a process for the middleware.

5. The computer-implemented method of claim 4, wherein launching the application comprises:
provisioning, by the device, the container by incorporating the process for the middleware into the container; and
launching, by the device, the application using the provisioned container.

6. The computer-implemented method of claim 1, wherein launching the application comprises:
registering, by the device, the application with the first execution environment; and
launching, by the device, the registered application into the first execution environment.

7. The computer-implemented method of claim 1, wherein launching the application comprises:
generating, by the device, a copy of the first execution environment having been prepared; and
launching, by the device, the application based on the copy of the first execution environment having been prepared.

8. The computer-implemented method of claim 1, further comprising:
preparing, by the device, the second execution environment for the middleware after the launching of the application.

9. A system comprising:
a memory that stores computer executable components; and
a processor, operably coupled to the memory, and that executes the computer executable components stored in the memory, wherein the computer executable components comprise:
at least one computer-executable component that:
prepares a first execution environment for middleware to be included in a container hosted on a machine;

based on a proxy agent implemented for middleware, instructs a container engine to generate a copy of a first execution environment, wherein the middleware is launched based on the copy of the first execution environment;

detects a request to schedule an application to be executed in the machine using the middleware;

in response to the request being detected, launches the application within the container based on the first execution environment having been prepared; and based on the request to schedule the application to be executed in the machine using the middleware, prepares a second execution environment for the middleware before the launching of the application.

10. The system of claim 9, wherein preparation of the first execution environment comprises:

in response to a container image being provided for the machine, determination of whether the container image includes the middleware; and in response to a determination that the container image includes the middleware, preparation of the first execution environment based on the container image.

11. The system of claim 9, wherein preparation of the first execution environment comprises:

preparation of the first execution environment by provisioning the container with the middleware executed therein.

12. The system of claim 9, wherein preparation of the first execution environment comprises:

preparation of the first execution environment by a launching of a process for the middleware.

13. The system of claim 12, wherein a launching the application comprises:

a provisioning of the container by incorporating the process for the middleware into the container; and a launching of the application using the provisioned container.

14. The system of claim 9, wherein the launching of the application comprises:

a registering of the application with the first execution environment; and a launching of the registered application into the first execution environment.

15. The system of claim 9, wherein the launching of the application comprises:

a generating of a copy of the first execution environment having been prepared; and a launching of the application based on the copy of the first execution environment having been prepared.

16. The system of claim 9, wherein the computer executable components further:

prepare the second execution environment for the middleware after the launching of the application.

17. A computer program product facilitating launching a middleware-based application, the computer program product comprising a computer readable storage medium having program instructions embodied therewith, the program instructions executable by a processor to cause the processor to:

prepare, by the processor, a first execution environment for middleware to be included in a container hosted on a machine;

based on a proxy agent implemented for middleware, instruct, by the processor, a container engine to generate a copy of the first execution environment, wherein the middleware is launched based on the copy of the first execution environment;

detect, by the processor, a request to schedule an application to be executed in the machine using the middleware;

in response to the request being detected, launch, by the processor, the application within the container based on the first execution environment having been prepared; and based on the request to schedule the application to be executed in the machine using the middleware, prepare, by the processor, a second execution environment for the middleware before the launching of the application.

18. The computer program product of claim 17, wherein preparation of the first execution environment comprises:

in response to a container image being provided for the machine, determination of whether the container image includes the middleware; and in response to determining that the container image includes the middleware, preparation of the first execution environment based on the container image.

* * * * *